United States Patent
Nishide et al.

(10) Patent No.: US 8,906,562 B2
(45) Date of Patent: Dec. 9, 2014

(54) POLYMERIC COMPOUND, OXYGEN PERMEABLE MEMBRANE, OXYGEN PERMEABLE COMPOSITE, ELECTROCHEMICAL DEVICE

(71) Applicant: Samsung Electronics Co., Ltd., Suwon-si, Gyeonggi-do (KR)

(72) Inventors: Niroyuki Nishide, Tokyo (JP); Satoshi Nakajima, Tokyo (JP); Yuichi Aihara, Yokohama (JP)

(73) Assignees: Samsung Electronics Co., Ltd. (KR); Cheil Industries Inc. (KR)

( * ) Notice: Subject to any disclaimer, the term of this patent is extended or adjusted under 35 U.S.C. 154(b) by 0 days.

(21) Appl. No.: 13/721,672

(22) Filed: Dec. 20, 2012

(65) Prior Publication Data

US 2014/0141343 A1    May 22, 2014

(30) Foreign Application Priority Data

Dec. 20, 2011 (JP) .................................. 2011-278571
Dec. 4, 2012 (KR) ........................ 10-2012-0139832

(51) Int. Cl.
*H01M 8/22* (2006.01)
*H01M 12/08* (2006.01)
*H01M 8/02* (2006.01)

(52) U.S. Cl.
CPC ............ *H01M 8/0221* (2013.01); *H01M 12/08* (2013.01); *H01M 8/0245* (2013.01); *Y02E 60/50* (2013.01)
USPC ....................................................... 429/403

(58) Field of Classification Search
USPC ........ 429/128, 403, 421, 480, 482, 483; 96/5; 540/145
See application file for complete search history.

(56) References Cited

U.S. PATENT DOCUMENTS 4,921,683 A    5/1990  Bedell
5,171,644 A   12/1992  Tsou et al.

(Continued)

FOREIGN PATENT DOCUMENTS

JP       2005-230648 A    9/2005

(Continued)

OTHER PUBLICATIONS

US 2013/0011765 is an English Translation of WO 2011/122399.*

(Continued)

*Primary Examiner* — Stewart Fraser
(74) *Attorney, Agent, or Firm* — Cantor Colburn LLP

(57) ABSTRACT

A polymeric compound having a backbone structure including an addition product of a (meth)acrylate compound and a nucleophile of a cobalt porphyrin complex including a tetraphenylporphyrin derivative represented by Formula 1 coordinated to a cobalt metal, Formula 1

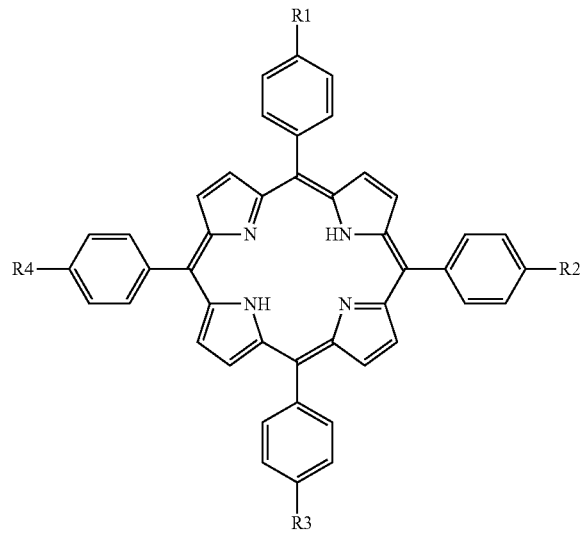

wherein substituents R1 to R4 are as described in the specification,
an oxygen permeable membrane including the polymeric compound, and an electrochemical device including the oxygen permeable membrane.

16 Claims, 3 Drawing Sheets

(56) References Cited

U.S. PATENT DOCUMENTS

| | | | |
|---|---|---|---|
| 5,215,820 A | 6/1993 | Hosokawa et al. | |
| 5,229,465 A * | 7/1993 | Tsuchida et al. | 525/326.2 |
| 5,314,760 A | 5/1994 | Tsou et al. | |
| 5,384,397 A * | 1/1995 | Zhang et al. | 540/145 |
| 5,580,682 A | 12/1996 | Chaloner-Gill | |
| 2004/0185324 A1* | 9/2004 | Bettelheim et al. | 429/41 |
| 2005/0209418 A1* | 9/2005 | Gridnev et al. | 526/171 |
| 2009/0239113 A1* | 9/2009 | Hase et al. | 429/27 |
| 2013/0011765 A1* | 1/2013 | Asazawa et al. | 429/482 |

FOREIGN PATENT DOCUMENTS

| | | |
|---|---|---|
| JP | 2010-258412 A | 8/2010 |
| JP | 2010-528412 A | 8/2010 |
| WO | 0220621 A1 | 3/2002 |
| WO | WO 2011122399 A1 * | 10/2011 |

OTHER PUBLICATIONS

Nishide et al., "Highly Selective Oxygen Permeation through a Poly(vinylidene dichloride)-Cobalt Porphyrin Membrane: Hopping Transport of Oxygen via the Fixed Cobalt Porphyrin Carrier", J. Phys. Chem. B, 102, 1998, pp. 8766-8770.

* cited by examiner

POLYMERIC COMPOUND, OXYGEN PERMEABLE MEMBRANE, OXYGEN PERMEABLE COMPOSITE, ELECTROCHEMICAL DEVICE

CROSS-REFERENCE TO RELATED APPLICATIONS

This application claims priority to and the benefit of Japanese Patent Application No. 10-2011-0278571, filed on Dec. 20, 2011, and Korean Patent Application No. 10-2012-0139832, filed on Dec. 4, 2012, the contents of which are incorporated herein in their entirety by reference.

BACKGROUND

1. Field

The present disclosure relates to a polymeric compound, an oxygen permeable membrane, an oxygen permeable composite, and an electrochemical device. More particularly, the present disclosure relates to a polymeric compound, which selectively intercalates or deintercalates oxygen, an oxygen permeable membrane including the polymeric compound, an oxygen permeable composite including the oxygen permeable membrane, and an electrochemical device including the oxygen permeable membrane.

2. Description of the Related Art

Recently, certain electrochemical devices, such as rechargeable secondary batteries using oxygen as a positive active material, such as lithium air cells, have drawn close attention. In such electrochemical devices, oxygen is externally supplied (from the air or an external oxygen supply unit) during a discharging operation, to take part in oxidation-reduction reactions in electrodes during charging and discharging. Thus, in electrochemical devices, such as lithium air batteries, in which bases its function on a redox reaction of oxygen, rapid injection of oxygen into the device significantly improves its electrical capacity. Because oxygen in the air is present in the mixture with other gaseous components, for example, nitrogen, a selective and efficient method of injection of the oxygen into the electrochemical device is desirable. To address this problem, a part of the electrochemical device capable of selectively binding (by way of intercalation/deintercalation) to oxygen molecules may be disposed in an oxygen inlet near a positive electrode (air electrode) of an electrochemical device.

One material capable of selectively binding to oxygen, is a cobalt porphyrin complex (hereinafter, referred to as a "CP" complex). Since a membrane, including the CP complex, is selectively permeable to oxygen gas, such a membrane has been suggested for and found utility in industrial use as an oxygen-selective permeable membrane or an oxygen enrichment membrane.

However, the CP complex is a rigid molecule which displays little flexibility. Accordingly, to improve the physical properties of the membrane, a portion of a polymer backbone unit excluding the CP complex, or a portion of a polymer material mixed with the CP complex, needs to be increased. However, this increase may prevent the CP complex ability from selectively intercalating and deintercalating oxygen, and may prevent an oxygen permeability of a CP complex-based membrane from being fully exhibited. Thus, there remains a need to produce a membrane possessing satisfactory oxygen permeability.

SUMMARY

Provided are polymeric compounds capable of selectively intercalating or deintercalating oxygen, oxygen permeable membranes with satisfactory oxygen permeability including the polymeric compounds, and oxygen permeable composites with satisfactory oxygen permeability including the oxygen permeable membranes. Provided also are electrochemical devices with improved electrochemical characteristics including the oxygen permeable membrane or the oxygen permeable composite.

Additional aspects will be set forth in part in the description which follows and, in part, will be apparent from the description, or may be learned by practice of the presented embodiments.

The inventors of the present disclosure have synthesized a polymeric compound with a CP complex having a nucleophile added to a multi-functional (meth)acrylate by a Michael addition reaction and found that the polymeric compound has a significantly higher CP complex content than existing polymeric compounds or membranes containing CP complexes.

According to an aspect of the present disclosure, there is provided a polymeric compound having a backbone structure including an addition reaction product of a (meth)acrylate compound and a nucleophile of a cobalt porphyrin complex including a tetraphenylporphyrin derivative represented by Formula 1 below coordinated to a cobalt metal.

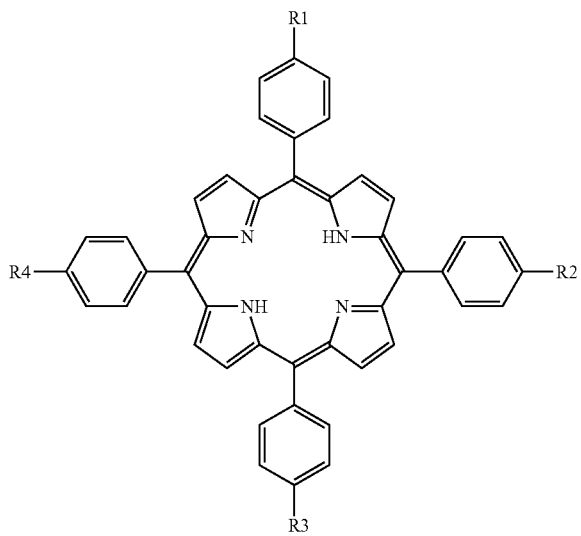

Formula 1 wherein
at least one of substituents R1 to R4 is a nucleophile, and
the remaining substituents R1 to R4, are each independently a hydrogen atom, a halogen atom, a C1-C10 alkyl group, a C1-C10 alkenyl group, a C1-C10 alkynyl group, or a C6-C12 aryl group.
In Formula 1, at least part of the nucleophile is added to the (meth)acrylate.
In some embodiments, the (meth)acrylate compound may include a di-functional (meth)acrylate, and the tetraphenylporphyrin derivative may include at least two nucleophiles.
In still some embodiments, the (meth)acrylate compound may include a tri-functional or a higher order multi-functional (meth)acrylate, and the tetraphenylporphyrin derivative, for example, may include one nucleophile.
In yet some embodiments, the (meth)acrylate compound may include a fluoroalkyl backbone.

According to another aspect of the present disclosure, there is provided an oxygen permeable membrane including the polymeric compound described above.

According to another aspect of the present disclosure, an oxygen permeable composite may include the oxygen permeable membrane disposed on a porous substrate or in pores of the porous substrate.

According to another aspect of the present disclosure, there is provided an electrochemical device including a positive electrode using oxygen as a positive active material; a negative electrode including a metal as a negative active material; an electrolyte disposed between the positive electrode and the negative electrode; and a barrier, disposed on the positive electrode, including the above-described oxygen permeable membrane or oxygen permeable composite, wherein the barrier facilitates an intake of the oxygen from an external source to the positive electrode.

In the electrochemical device, the metal may be lithium or a lithium alloy.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
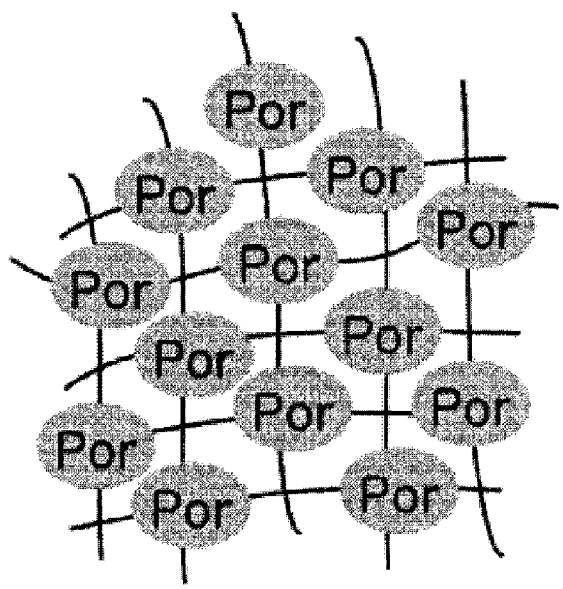
FIG. 1A is a schematic view of a structure of a polymeric compound according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present disclosure. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" and "upper," may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"Alkyl" as used herein means a monovalent group derived from a straight or branched chain saturated aliphatic hydrocarbon having the specified number of carbon atoms.

"Alkenyl" as used herein means a monovalent group derived from a straight or branched chain aliphatic hydrocarbon including at least one carbon-carbon double bond and having the specified number of carbon atoms.

"Alkynyl" as used herein means a monovalent group derived from a straight or branched chain aliphatic hydrocarbon including at least one carbon-carbon triple bond and having the specified number of carbon atoms.

"Aryl" as used herein means a monovalent group derived from a cyclic hydrocarbon wherein all ring members are carbon and at least one ring is aromatic, and having the specified number of carbon atoms.

1. Polymeric Compound 1.1. Structure of Polymeric Compound

Figure 1B:
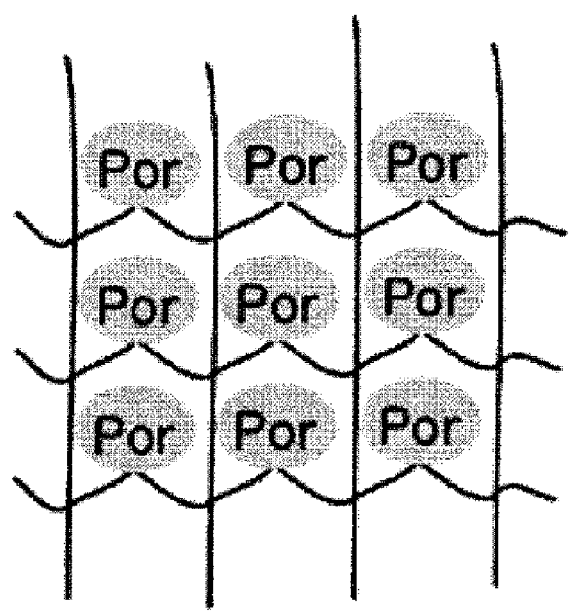
FIG. 1B is a schematic view of a structure of a polymeric compound according to another embodiment of the present disclosure.

First, a structure of a polymeric compound according to an embodiment will now be described with reference to FIGS. 1A and 1B. FIG. 1A is a schematic view of a structure of a polymeric compound according to an embodiment, and FIG. 1B is a schematic view of a structure of a polymeric compound according to another embodiment. Hereinafter, unless specified otherwise, the term "acrylate" and "(meth)acrylate"

are used interchangeably, i.e., the term "acrylate" is construed as "(methacrylate)" and the term "(meth)acrylate" is construed as "acrylate".

A polymeric compound according to an embodiment may include a polymer backbone structure obtained by a Michael addition reaction between an acrylate compound and a cobalt porphyrin complex, wherein the cobalt porphyrin complex directly binds to the acrylate compound to form the backbone. The cobalt porphyrin complex may be present in a main chain or a side chain of the backbone of the polymeric compound. Hereinafter, the acrylate compound and the cobalt porphyrin complex of the polymeric compound will be described in a greater detail.

Acrylate Compound

The acrylate compound may be a multi-functional acrylate including at least two acryl groups that may act as Michael acceptors in a Michael addition reaction, as a mono-functional acrylate may not form a polymer backbone with the cobalt porphyrin complex.

A multi-functional acrylate may be a di-functional acrylate, a tri-functional acrylate, a tetra-functional acrylate, or a higher order multi-functional acrylate. Non-limiting examples of available di-functional acrylates include reactive monomers, such as neopentyl glycol diacrylate and dipropylene glycol diacrylate, and reactive oligomers, such as polyethylene glycol diacrylate, urethane acrylate, and epoxy acrylate. Non-limiting examples of available tri-functional acrylates include reactive monomers or oligomers, such as trimethanolpropane triacrylate, trimethanolpropane trimethacrylate, pentaerythritol triacrylate, ethoxylated trimethanolpropane triacrylate, and propoxylated trimethanolpropane triacrylate. Non-limiting examples of available tetra-functional or higher order acrylates include reactive monomers or oligomers, such as pentaerythritol tetraacrylate and dipentaerythritol hexaacrylate.

The di-functional, tri-functional or higher order multi-functional acrylates may include a single-chain acrylate having a number of carbon atoms of about 20 or less, and in some embodiments, about 15 or less, for example, diacrylate represented by Formula 2 below or tetraacrylate represented by Formula 3 below.

Formula 2

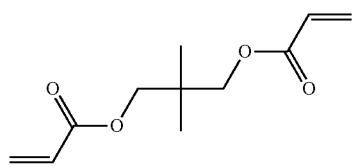

Formula 3

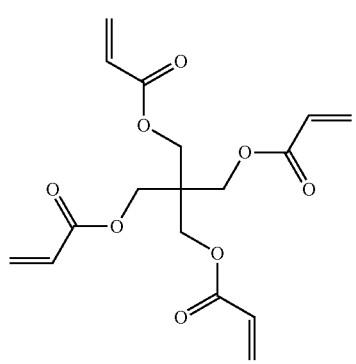

The above-listed di-functional, tri-functional, or higher order multi-functional acrylates may be used either alone or in a combination with at least one other acrylate compound. The above-listed di-functional acrylates, tri-functional acrylates, or higher order multi-functional acrylates may be synthesized according to known methods, or may be available from commercial sources.

The acrylate compound may include a fluoroalkyl backbone. When a polymeric compound is synthesized using the acrylate compound including a fluoroalkyl backbone and a cobalt porphyrin complex, the polymeric compound may display water repellency. An example of the acrylate compound with a fluoroalkyl backbone is diacrylate represented by Formula 4 below, but is not limited thereto.

Formula 4

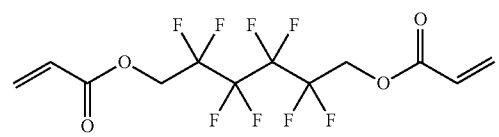

Cobalt Porphyrin Complex

The cobalt porphyrin complex (hereinafter, referred to as a "CP complex") may be a complex of tetraphenyl porphyrin of Formula 1 below (hereinafter, referred to as a "TPP") coordinated with cobalt.

Formula 1

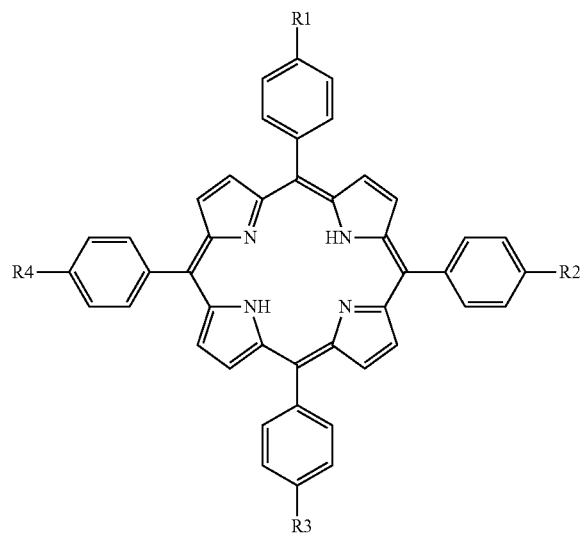

In Formula 1 above, at least one of substituents R1 to R4 may be a nucleophile.

The term "nucleophile" refers to a moiety (functional group) acting as a Michael donor in a Michael addition reaction. The nucleophile may be a functional group including a nitrogen atom or an oxygen atom having an unshared electron pair. Non-limiting examples of the nucleophile are an amino group, an acetoacetate group, an acetoacetate amide group, and a cyano acetate group. For example, an amino group and/or an acetoacetate group may be present in the molecule of the Michael donor. When an acetoacetate group is used as the nucleophile, the solubility of the acrylate compound in a cast solution may be enhanced, and forming a membrane from the polymeric compound may be further facilitated.

The remaining substituents R1 to R4 are not particularly limited, and may be substituents with relatively small molecular weights so the content of the CP complex (hereinafter, referred to as a "porphyrin content") in the polymeric compound may be similar. Examples of substituents R1 to R4 are a hydrogen atom, a halogen atom (for example, F—, Cl—, Br—, or I—), a C1-C10 alkyl group, a $C_{10 10}$ alkenyl group, a C1-C10 alkynyl group, or a C6-C12 aryl group.

When the acrylate compound includes only a di-functional acrylate, and the TPP complex includes only one nucleophile, the acrylate compound and the CP complex may not form a polymer backbone. Thus, when the acrylate compound includes only a di-functional acrylate, in order to form a polymeric compound, a TPP derivative with at least two nucleophiles is required.

When the acrylate compound includes at least one tri-functional or higher order multi-functional acrylate, the acrylate compound may form a polymer backbone by reacting with the CP complex, even if the TPP complex includes only one nucleophile. Thus, when the acrylate compound includes at least one tri-functional or a higher order multi-functional acrylate, a TPP derivative having at least one nucleophile may be used. In another embodiment, the TPP derivative may include at least two nucleophiles.

Polymeric Compound

A polymeric compound may be obtained through a Michael addition reaction between the above-described multi-functional acrylate compound and the CP complex. In this reaction, some or all of the nucleophiles of the CP complex (for example, amino group, acetoacetate group, or the like) may be added to an acryl group of the acrylate compound. A structure of the polymeric compound will now be described with reference to FIGS. 1A and 1B. In FIGS. 1A and 1B, "Por" indicates the site of a porphyrin, i.e., the site originating from the CP complex.

Embodiment 1

A polymeric compound according to an embodiment of the present disclosure may have a structure shown in FIG. 1A, wherein a main chain of the backbone of the polymeric compound may include the (meth)acrylate compound and the CP complex. Thus, the CP complex may be interposed among the acrylate compounds and the acrylate compound may be interposed among the CP complexes.

The foregoing structure may be obtained, for example, by adding a tetra-substituted CP complex having four nucleophiles to a di-functional acrylate compound and/or tetra-functional acrylate compound via a Michael addition reaction. In this regard, the types and amounts of the acrylate compound and CP complex may be appropriately chosen to vary cross-linking points (binding points) of the acrylate compound and the CP complex. The number of the cross-linking points may thereby be increased to obtain a polymeric compound that is insoluble or has little solubility in an organic solvent.

Embodiment 2

A polymeric compound according to another embodiment of the present disclosure may have the structure shown in FIG. 1B, wherein the main chain of the backbone of the polymeric compound includes a polymerization product of the (meth)acrylate compound and a side chain from the main chain includes the CP complex as a result of the Michael addition reaction between the acrylate compound and the CP complex. Thus, as a result of polymerization of the acrylate compound (or copolymerization of at least two acrylate compounds), a polyacrylate main chain may be obtained, and the CP complex may be bound to a side chain of the polyacrylate main chain.

The foregoing structure may be obtained, for example, by adding a mono-substituted CP complex including only one functional group to a tetra-functional acrylate compound wherein only one nucleophile participates in a Michael addition reaction. In this case, the number of the resulting cross-linking points may be controlled to obtain a polymeric compound that is nearly insoluble in an organic solvent. Accordingly, a membrane with appropriate brittleness may be prepared using the foregoing polymeric compound. The polymeric compound of Embodiment 2 may contain a higher content of porphyrin (i.e., a higher content of the CP complex in the polymeric compound) than the polymeric compound of Embodiment 1.

Molecular Weight (Polymerization Degree) of Polymeric Compound

A molecular weight (polymerization degree) of the polymeric compound is not limited herein; rather the molecular weight (polymerization degree) may be appropriately adjusted.

1.2. Synthesis Method of Polymeric Compound

Hereinafter, a method of synthesizing the polymeric compound having the structure described in the embodiments above will be disclosed.

As described above, the polymeric compound may be obtained through a Michael addition reaction between a di-functional, and/or a tri-functional or a higher order multi-functional acrylate compound and a CP complex having at least one nucleophile. In particular, in synthesizing the polymeric compound, the nucleophile (amino group, acetoacetate group, or the like) acting as a Michael donor reacts with an acryl group of the acrylate compound acting as a Michael acceptor, thereby adding the CP complex to the acrylate compound. This process will be described in a greater detail below.

Preparation of Acrylate Compound

First, an acrylate compound is prepared for the synthesis of the polymeric compound. The acrylate compound may be synthesized using a known method or may be a commercially available compound. Examples of the commercially available compound are neopentyl glycol diacrylate (available from Aldrich), pentaerythritol tetra acrylate (available from Aldrich), 1,4-bis(acryloyloxy)butane (available from TCI), 1,10-bis(acryloyloxy)decane (available from TCI), tetraethylene glycol diacrylate (available from TCI), pentaerythritol triacrylate (available from SHIN-NAKAMURA CHEMICAL CO., LTD.), trimethylolpropane triacrylate (available from SHIN-NAKAMURA CHEMICAL CO., LTD.), bisphenol-A epoxyacrylate (available from DAICEL-CYTEC COMPANY LTD.), and an aromatic urethane acrylate (available from DAICEL-CYTEC COMPANY LTD.).

Synthesis of Tetraphenylporphyrin Derivative

Tetraphenylporphyrin may be synthesized using a known method, or may be purchased from commercial sources. Examples of commercially available tetraphenylporphyrin are tetraphenylporphyrins (available from TCI, Waco Chemicals, Sigma Aldrich, Strem Chemicals, and the like).

Next, a nucleophile (acting as a Michael donor), such as an amino group or an acetoacetate group, is introduced into the phenyl groups of tetraphenylporphyrin. The nucleophile may be introduced via a known organic synthesis reaction. For example, an amino group (which may be mono-, di-, or tri-substituted) may be introduced as follows:

First, in order to introduce an amino group, for example, as illustrated in Reaction Scheme 1 below, tetraphenylporphyrin and sodium nitrite are reacted in trifluoroacetic acid to produce a tetraphenylporphyrin derivative with 1 to 3 nitro groups. Then, the nitro groups are reduced using a reducing agent, such as concentrated hydrochloric acid to thereby give a tetraphenylporphyrin derivative having 1 to 3 amino groups.

Scheme 1

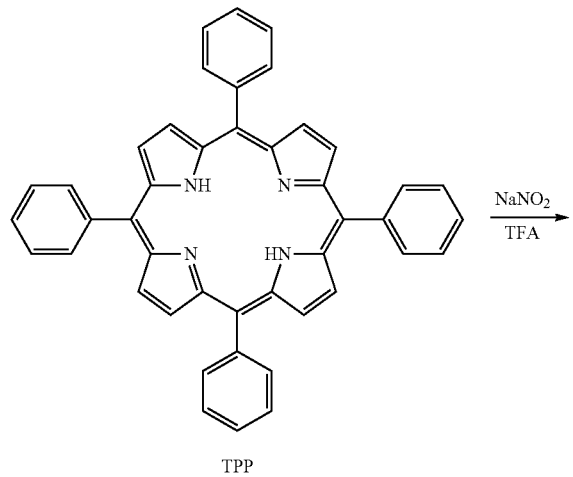

TPP

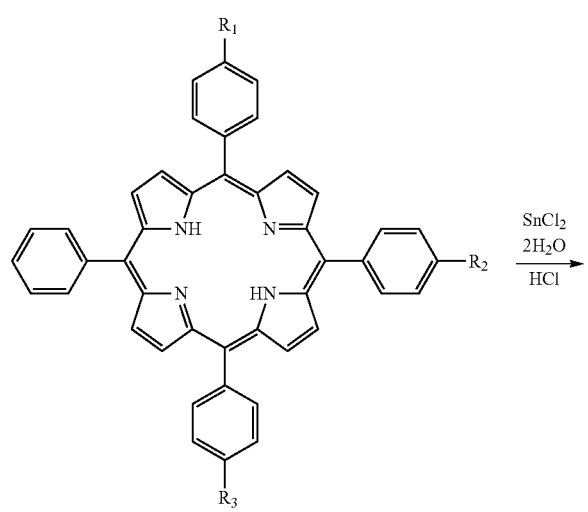

1a ($R_1$:$NO_2$, $R_2$:H, $R_3$:H)
1b ($R_1$:$NO_2$, $R_2$:$NO_2$, $R_3$:H)
1c ($R_1$:$NO_2$, $R_2$:H, $R_3$:$NO_2$)
1d ($R_1$:$NO_2$, $R_2$:$NO_2$, $R_3$:$NO_2$)

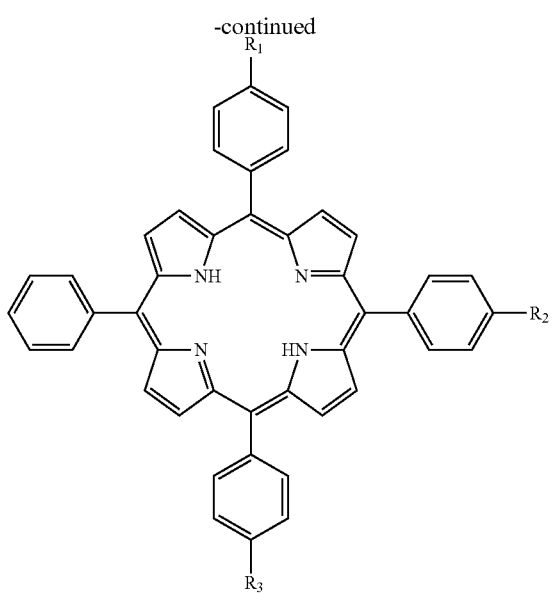

2a ($R_1$:$NH_2$, $R_2$:H, $R_3$:H)
2b ($R_1$:$NH_2$, $R_2$:$NH_2$, $R_3$:H)
2c ($R_1$:$NH_2$, $R_2$:H, $R_3$:$NH_2$)
2d ($R_1$:$NH_2$, $R_2$:$NH_2$, $R_3$:$NH_2$)

Although the tetraphenylporphyrin derivative may be synthesized as described above, any commercially available tetraphenylporphyrin derivative may also be used. An example of a commercially available tetraphenylporphyrin derivative is 5,10,15,20-tetrakis(4-aminophenyl)-21H,23H-porphyrin (available from TCI).

Cobalt Coordination

The tetraphenylporphyrin derivative synthesized as described above may be coordinated with cobalt using a known method, but is not limited thereto. For example, a solution of the tetraphenylporphyrin derivative in a mixed solvent of dimethylformamide ("DMF") and chloroform may react with cobalt chloride hexahydrate in the presence of rutidine, thereby synthesizing a CP complex of the tetraphenylporphyrin derivative.

Michael Addition Reaction

Next, in order to synthesize the polymeric compound, the CP complex synthesized as described above and the acrylate compound are dissolved in an appropriate solvent, and a catalyst is added thereto to facilitate a Michael addition reaction.

Non-limiting examples of the solvent include acetone, chloroform, benzene, tetrahydrofuran, ethanol, and 2,2,2-trifluoroethanol. An appropriate solvent may be selected depending on solubility of the CP complex and the acrylate compound in the solvent.

A catalyst may be selected from a variety of common catalysts used in a Michael addition reaction. Non-limiting examples of the catalyst are amine catalysts, such as 1,8-diazabicyclo[5.4.0]undec-7-ene ("DBU"), N,N,N',N'-tetramethylethylenediamine, N,N,N',N'-tetramethylalkylenediamine, and N-methylcyclohexylamine; basic catalysts, such as sodium methoxide, sodium ethoxide, potassium tert-butoxide, sodium hydroxide, quaternary ammonium hydroxides, such as tetramethylammonium hydroxide, sodium metal, and n-butyl lithium. Non-limiting examples of organic metal catalysts are ruthenium cyclooctadiene cyclooctatriene, iron acetylacetonate, and nickel acetylacetonate. However, a catalyst not containing a metal may also be used.

1.3. Effect of Polymer Compound

According to the above-described embodiments, the polymeric compound of the present disclosure has more cross-linking points between the CP complex and the acrylate compound (i.e., more binding points between the nucleophile of the CP complex and the acryl group of the acrylate compound) than the existing polymeric compounds. Therefore, the polymeric compound according to the present disclosure may have a higher porphyrin content (higher content of the CP complex in the polymeric compound) than the existing polymeric compounds. In particular, the use of a single acrylate as the acrylate compound may lead to a markedly higher porphyrin content than existing CP complex-containing compounds.

When a fluoro group is present in an alkyl chain of the acrylate compound, the CP complex-containing the polymeric compound may display improved water repellency.

2. Oxygen Permeable Membrane and Oxygen Permeable Composite

Hereinafter, an oxygen permeable membrane and an oxygen permeable composite each using the polymeric compound described above will be described in a greater detail.

According to an embodiment of the present disclosure, an oxygen permeable membrane may be formed using the polymer compound. The oxygen permeable membrane is a self-standing membrane having enhanced flexibility, and thus maybe used for a variety of purposes, for example, it may serve as a barrier in an electrochemical device. The polymeric compound of the present disclosure has a high porphyrin content (i.e., a high CP complex content), so it allows selective binding (intercalation/deintercalation) of oxygen molecules to the CP complex. Thus, the oxygen permeable membrane including the polymeric compound may display high oxygen permeability, and may allow a large amount of oxygen to selectively pass through the oxygen permeable membrane.

Furthermore, when an acrylate compound includes a fluoro group in its alkyl chain, a polymeric compound with improved water repellency may be obtained. Therefore, an oxygen permeable membrane including such a polymeric compound may display high performance coupled with high oxygen permeability and high water repellency. In this regard, the polymeric compound including the fluoroalkyl backbone has high oxygen permeability, and thus may facilitate oxygen diffusion into the membrane. Furthermore, due to the water repelling effect of the oxygen permeable membrane, oxygen inflow into the membrane is unlikely to be blocked by the water droplets on the surface of the oxygen permeable membrane. Therefore, the oxygen permeable membrane may be installed, for example, onto an oxygen inlet of an electrochemical device to stably supply oxygen to the electrochemical device.

The oxygen permeable membrane may be disposed on a porous substrate or in pores of the porous substrate to form an oxygen permeable composite. Since the oxygen permeable membrane is bound with the porous substrate, water repellency, and thus, durability of the oxygen permeable composite including the oxygen permeable membrane on the porous substrate may be improved. Therefore, using the foregoing oxygen permeable composite may ensure a more stable oxygen permeability for an extended period of time. For example, the oxygen permeable composite may be installed onto an oxygen inlet of an electrochemical device to stably supply oxygen to the electrochemical device for an extended period of time.

Furthermore, since the oxygen permeable membrane has a high CP complex content (ratio), the oxygen permeable membrane may still have higher oxygen permeability than existing oxygen permeable membranes with a low CP complex content even when being on the porous substrate or in the pores of the porous substrate.

3. Electrochemical Device

Hereinafter, an electrochemical device according to an embodiment of the present disclosure using the oxygen permeable membrane or the oxygen permeable composite will be described in a greater detail.

According to embodiments of the present disclosure, the electrochemical device may employ an oxidation reduction (redox) reaction including oxygen. Accordingly, the electrochemical device may be, for example, a metal air battery or a fuel cell. Hereinafter, embodiments of the present disclosure will be described with reference to a metal air battery.

A metal air battery is a rechargeable battery including oxygen as a positive active material and a metal as a negative active material. Since oxygen as the positive active material is available from the air, the positive active material is not charged in the metal air battery, so a larger proportion of the negative active material may be used in a battery container. Thus, theoretically the metal air battery may have a higher capacity than the secondary batteries which use solid positive active material.

In the metal air battery, Reaction A represented below takes place at the negative electrode. This is an example wherein lithium is used as a negative active material.

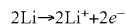   Reaction A

Electrons generated from Reaction A reach a positive electrode via an external circuit. Lithium ions (Li$^+$) generated from Reaction A migrate by electroosmosis through an electrolyte supported by the negative electrode and the positive electrode in a direction from the negative electrode toward the positive electrode.

Reaction B and Reaction C represented below take place at a positive electrode.

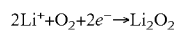   Reaction B

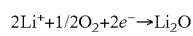   Reaction C

Lithium peroxide (Li$_2$O$_2$) and lithium oxide (Li$_2$O) generated at the positive electrode are accumulated in a solid form at the positive electrode (air electrode). During charging, a reaction reverse to Reaction A takes place at the negative electrode, and reactions reverse to Reaction B and Reaction C take place at the positive electrode. As a result, lithium metal is generated at the negative electrode, enabling redischarging.

In an embodiment, when the electrochemical device is a metal air battery based on the above-described principle, generally, a porous gas diffusion electrode with an increased surface area to take a larger amount of oxygen may be used as the positive electrode. The gas diffusion electrode may include, for example, a porous carbonaceous material. A metal electrode using a metal as an active material may act as the negative electrode. Non-limiting examples of the metal as a negative active material are lithium, sodium, calcium, magnesium, aluminum, zinc, a combination thereof, and an alloy thereof.

When the negative active material includes ionized metal ions (for example, lithium ions) to be conductive, an electrolyte may be an aqueous electrolyte solution, a non-aqueous electrolyte solution, a polymer electrolyte, or an inorganic solid electrolyte, but is not limited thereto.

In the electrochemical device using oxygen as the positive active material, when the oxygen is externally supplied from the air, an efficient supply of gas with a high oxygen partial pressure is desired. In this regard, according to an embodiment of the present disclosure, the electrochemical device may include the above-described oxygen permeable membrane or oxygen permeable composite as a barrier, wherein the barrier is disposed near an air inlet via which external air is supplied to the positive electrode, so the barrier facilitates an intake of the oxygen from an external source to the positive electrode.

Since the oxygen permeable membrane or the oxygen permeable composite disposed near the oxygen inlet includes a polymeric compound with a high CP complex content that binds selectively to oxygen, as described above, the oxygen permeable membrane or the oxygen permeable composite may be permeable to a large amount of oxygen. Accordingly, when the oxygen permeable membrane or oxygen permeable composite is disposed near the air inlet of the electrochemical device, a gas with a high oxygen partial pressure may be stably supplied into the electrochemical device, which thus may exhibit improved electrochemical characteristics. In particular, by using the oxygen permeable membrane or oxygen permeable composite as a barrier for the air inlet of an electrochemical device using oxygen as a positive active material, the air may be supplied with a higher oxygen concentration into the electrochemical device, and an overvoltage occurring during redox reaction may be reduced. (With the assumption of a 4-electron reaction at an air oxygen concentration of 21% at 25° C. with a shift factor of 0.5, a theoretical overvoltage is at least 28 milliVolts ("mV"). However, an actual overvoltage is usually higher than the theoretical level due to complicated activation processes).

Hereinafter, the embodiments are illustrated in more detail with reference to examples. However, the following examples are only exemplary embodiments and therefore are not limiting.

EXAMPLES

Manufacture and Evaluation of Oxygen Permeable Membranes

Oxygen permeable membranes according to Examples 1 to 4 and Comparative Examples 1 to 3 were manufactured as follows Example 1

Manufacture of Oxygen Permeable Membrane

In the present example, a polymeric compound was synthesized by a Michael addition reaction between tetraphenylporphyrin ("TPP") having one acetoacetyl group and coordinated with cobalt as a CP complex and a tetra-functional acrylate as an acrylate compound.

In particular, first, a monomer (acetoacetate-substituted porphyrin) with the acetoacetate group acting as a Michael donor is attached to the TPP was synthesized according to Reaction Scheme 2 below.

To a solution of 100 mg (0.15 mmol) of 5-(4-methoxycarbonylphenyl)-10,15,20-triphenylporphyrin in a mixed solvent of DMF/chloroform was added a small amount of rutidine and 141 mg (0.6 mmol, 4 eq) of cobalt chloride hexahydrate. The resulting mixture was then stirred in a nitrogen atmosphere at about 50° C. for about 12 hours The product was purified by reprecipitation to give a purple powder of cobalt porphyrin 2(Co) (77 mg, Yield: 70%). The number of Q bands in the UV spectrum of the powder 2(Co) was reduced from 4 to 2, indicating the incorporation of cobalt.

50 mg (0.068 mmol) of Cobalt porphyrin 2(Co) and 5.2 mg (0.14 mmol) of lithium aluminum hydride were dissolved in THF and the resulting mixture was stirred at room temperature in a nitrogen atmosphere for about 1 hour. Subsequent purification by column chromatography yielded a purple powder of 3(Co) (25.8 mg, Yield: 59%). After dissolving 23 mg (0.033 mmol) of 3(Co) powder in toluene, 4.2 mg (0.045 mmol, 1.5 eq) of diketene and TEA were added, and the reaction mixture was stirred at room temperature overnight Subsequent purification by column chromatography yielded reddish purple powder of 1(Co) (8.3 mg, Yield: 27%) as a CP complex with an acetoacetate group (acetoacetate-substituted cobalt porphyrin).

Reaction Scheme 2

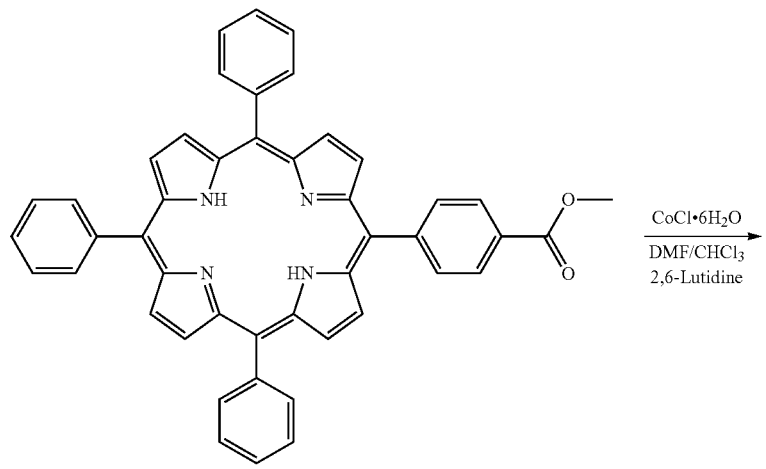

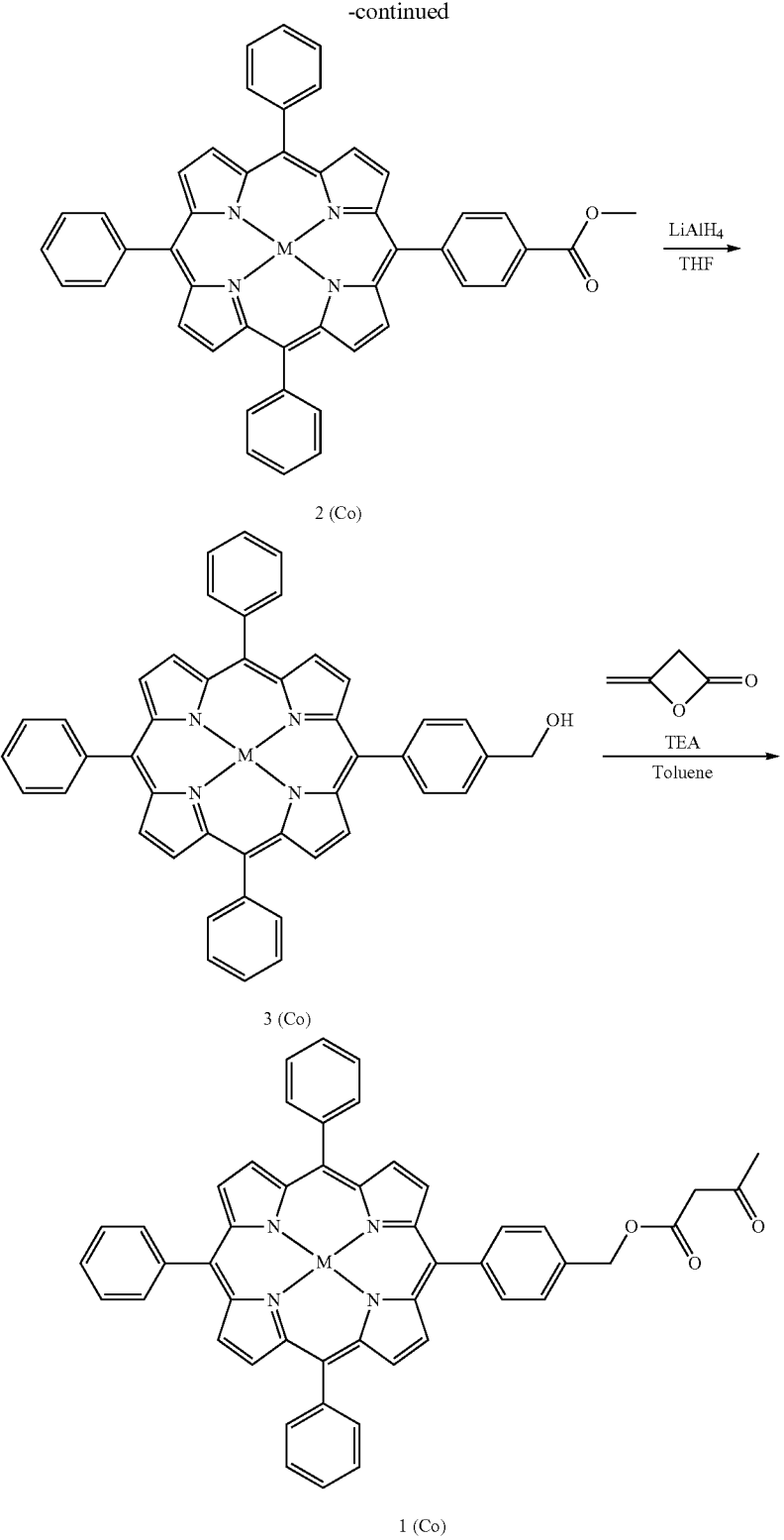

2 (Co)

3 (Co)

1 (Co)

The CP complex prepared as described above was subjected to a Michael addition reaction to manufacture an oxygen permeable membrane including the CP complex. In the present example, to enhance the mechanical strength of the oxygen permeable membrane, the oxygen permeable membrane, including the CP complex, was manufactured on a support membrane. As the support membrane, a polypropylene membrane (Cell Guard #2400, #3501) which is gas permeable and insoluble in a solvent used in forming the oxygen permeable membrane, was used. In particular, as illustrated in Reaction Scheme 3 below, the acetoacetate-substituted cobalt porphyrin 1(Co), tetra-functional acrylate 2, and 1 percent by weight ("weight %") of 1,8-diazabicyclo[5,4,0]-undec-7-ene ("DBU") as a catalyst were dissolved in a mole ratio of 1:0.5 in chloroform to form a 40 mM solution. The solution was then applied onto the support membrane at room temperature using a bar coating method to form a thin film, which was then dried for one day, and cured, thereby manufacturing the oxygen permeable membrane (I) of Example 1.

Figure 2:
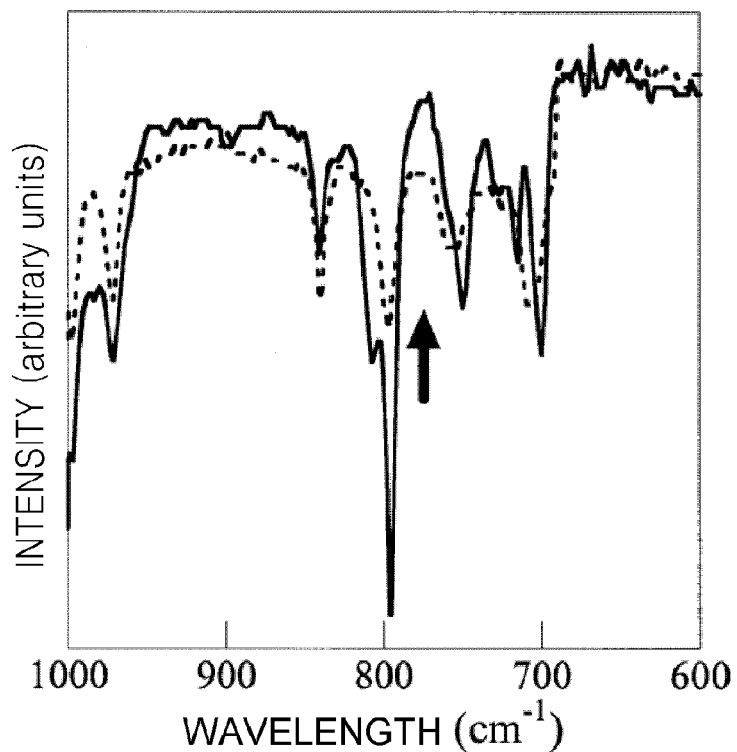
FIG. 2 illustrates infrared ("IR") spectra of an oxygen permeable membrane of Example 1 before (shown in a solid line) and after (shown in a dashed line) a curing process.

The infrared ("IR") spectra obtained before and after the curing process, as shown in FIG. 2 by solid and dashed lines, respectively, revealed that an absorption band near 790 cm$^{-1}$ originating from C=C deformation vibration had a reduced intensity, thus indicating that the acetoacetate-substituted cobalt porphyrin 1(Co) was formed on the support membrane via the Michael addition reaction. A degree of conversion of the acryl group to the product calculated from the area of the absorption peak near 790 cm$^{-1}$ was about 76%. A porphyrin content in the CP complex was about 80 weight % based on the initially added amount thereof.

Reaction Scheme 3

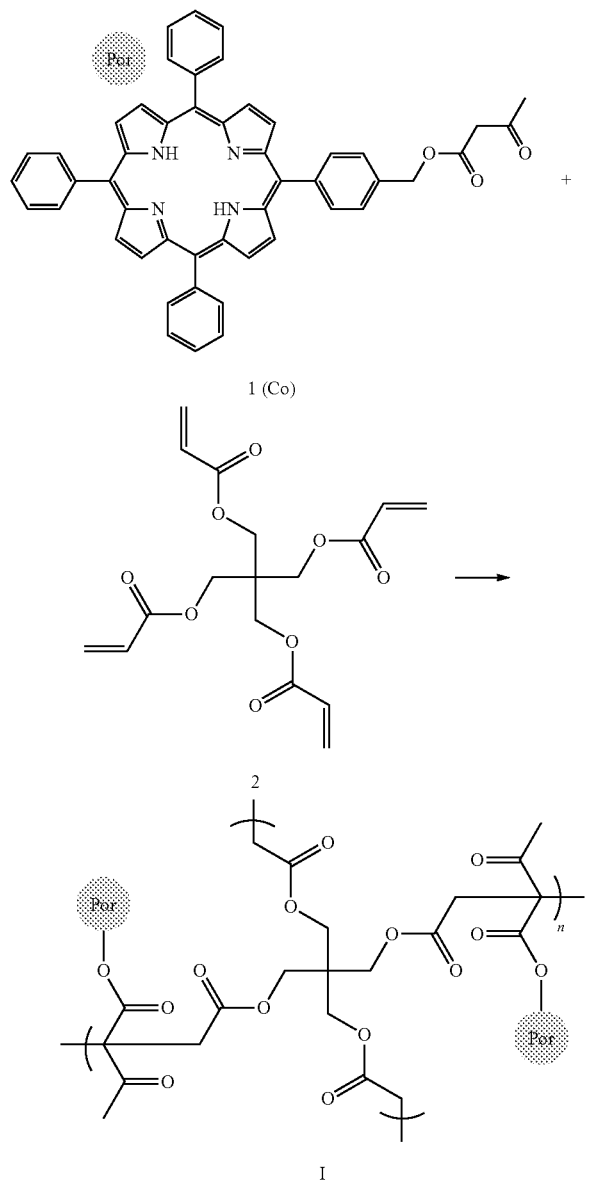

Example 1

Preparation of Oxygen Permeable Composite

An oxygen permeable composite with the oxygen permeable membrane of Example 1 on a porous substrate was manufactured. In particular, a hydrophilic polypropylene membrane (Cell Guard #2400 having a thickness of 25 micrometers ("µm") and a pore diameter of 0.125×0.05 µm; Cell Guard #3051 having a thickness of 25 µm) was selected as the porous substrate (porous support membrane). The polypropylene membrane, as the support membrane, which was gas permeable and hydrophobic, did not repel chloroform solution to allow the porphyrin solution to be uniformly coated thereon. As illustrated in Reaction Scheme 3, 10 mg of the acetoacetate-substituted cobalt porphyrin 1(Co) (MW: 785.8), 2.5 mg (MW: 352.4, 0.5 eq.) of tetra-functional acrylate 2, and 1 weight % of DBU were dissolved in 0.2 mL of chloroform to obtain a mixture, which was subsequently coated to form a film on a porous support membrane (6 cm×6 cm) using a bar coating method, followed by curing at room temperature for about 12 hours to obtain an oxygen permeable membrane. No delamination of the oxygen permeable membrane from the porous support membrane occurred even after the curing. As a result, the oxygen permeable composite with the oxygen permeable membrane containing about 80 weight % of the CP complex on the permeable support membrane was obtained.

Example 2

Manufacture of Oxygen Permeable Membrane

In the present example, a polymeric compound was synthesized by a Michael addition reaction with tetraphenylporphyrin ("TPP") having four amino groups and coordinated to cobalt as a CP complex and a di-functional acrylate as an acrylate compound.

In particular, first, 4-aminophenylporphyrin (available from Tolyl Chemical Industry Co., Ltd. (TCI)) with an amino group introduced as a Michael donor into TPP, as represented by Formula 2e below, was prepared. Next, by reference to Reaction Scheme 2 above, the tetra-substituted aminophenylporphyrin was coordinated with cobalt to synthesize the CP complex.

Formula 2e

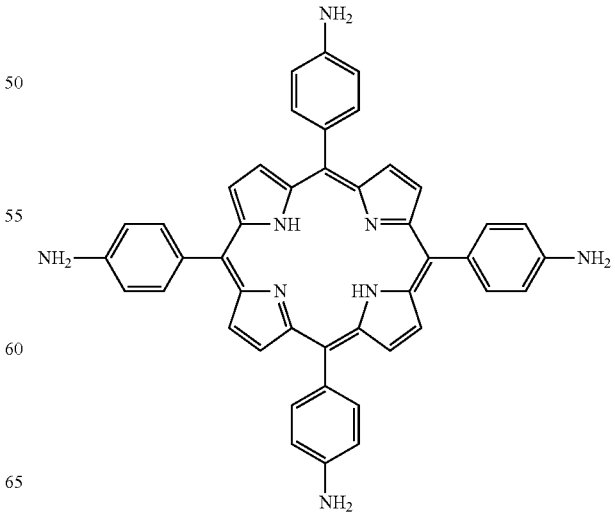

Furthermore, by reference to Reaction Scheme 1 above, a method of synthesizing mono-substituted, di-substituted, and tri-substituted aminophenylporphyrin is described below.

First, 2.5 g (4.07 mmol) of TPP (available from TCI) was put in a 500-mL recovery flask and dissolved in 125 mL of tetrafluoroacetic acid, followed by an addition of 2.28 g (33.3 mmol) of sodium nitride and stirring at room temperature for about 5 minutes. The reaction mixture was then poured into a beaker containing ice water to terminate the reaction, followed by extraction with chloroform, and washing with a saturated potassium carbonate solution and water. The resulting product was dried using magnesium sulfate to remove the solvent, so that a mixture of nitroporphyrins 1a (mono-substituted product), 1b, 1c (di-substituted products), and 1d (tri-substituted product) was obtained. This mixture was used as it was because of difficulty in isolating the individual nitroporphyrins 1a, 1b, 1c, and 1d. 2.9 g of the mixture of nitroporphyrins 1a, 1b, 1c, and 1d were put in a 1 L flask and dissolved with 500 mL of concentrated hydrochloric acid, and stirred at about 70° C. for about 30 minutes. After termination of the reaction, the reaction product was cooled, neutralized with aqueous ammonia, and extracted with chloroform. The resulting product was then dried using magnesium sulfate to remove the solvent to give a purple powder. This product was isolated and purified using column chromatography (eluent-chloroform/acetone=8/1). As a result, mono-substituted aminophenyl porphyrin 2a (0.32 g, 13%), di-substituted aminophenyl porphyrin 2b (0.97 g, 37%), di-substituted aminophenyl porphyrin 2c (0.48 g, 18%), and tri-substituted aminophenyl porphyrin 2d (0.29 g, 11%) were obtained.

The CP complex synthesized as above was subjected to a Michael addition reaction to manufacture an oxygen permeable membrane, including the CP complex. In the present example, to enhance the mechanical strength of the oxygen permeable membrane, the oxygen permeable membrane, including the CP complex, was manufactured on a support membrane. As the support membrane, a polypropylene membrane (Cell Guard #2400, #3501) that is gas permeable and insoluble in a solvent was used in forming the oxygen permeable membrane. In particular, as illustrated in Reaction Scheme 4 (wherein "Co" is not shown), 0.8 mg (0.5 eq) of a di-functional acrylate 3a, and 5 mg of the CP complex of the tetra-substituted aminophenyl porphyrin coordinated with Co were dissolved in acetone, and 1 weight % of DBU was added thereto. This resulting product was applied onto a support membrane at room temperature using a drop casting method to form a film, which was then dried at room temperature overnight, followed by annealing at about 180° C. for about 4 hours, thereby manufacturing an oxygen permeable membrane II of Example 2. The oxygen permeable membrane of Example 2 had a low cross-linking degree, and was partially dissolved in chloroform.

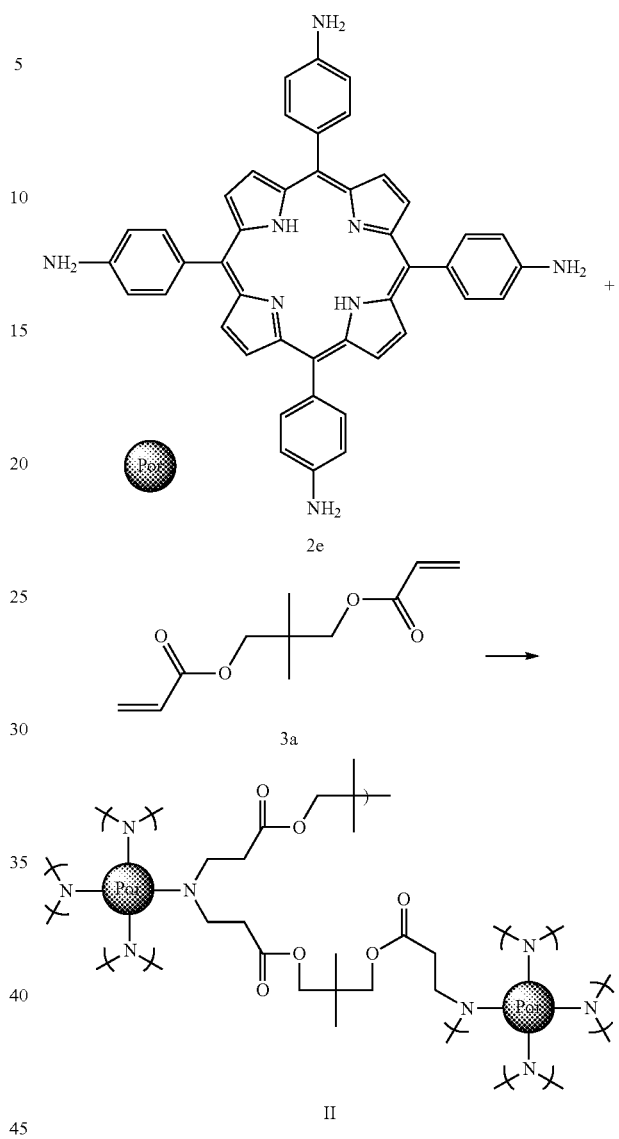

As in Example 1, the results of IR spectroscopy before and after the curing suggest that the Michael addition reaction with the tetra-substituted aminophenyl porphyrin occurred on the support membrane. A degree of conversion of the acryl group was about 75%. A porphyrin content in the CP complex was about 70 weight % based on an initially added amount thereof.

Example 3

Manufacture of Oxygen Permeable Membrane

In the present example, a polymeric compound was synthesized by a Michael addition reaction with TPP having four amino groups and coordinated to cobalt as a CP complex and a tetra-functional acrylate as an acrylate compound.

In particular, an oxygen permeable membrane of Example 3 was manufactured in the same manner as in Example 2, except that 0.4 mg (0.5 eq) of tetra-functional acrylate, instead of 0.8 mg (0.5 eq) of di-functional acrylate, was used. As a result, the oxygen permeable membrane of Example 3 was found to be insoluble in chloroform.

As in Example 1, the IR spectra obtained before and after the curing suggest that the Michael addition reaction with the tetra-substituted aminophenyl porphyrin occurred on the support membrane. A reaction conversion ratio of the acryl group was about 76%. A porphyrin content in the CP complex was about 70 weight % based on an initially added amount thereof.

Example 4

Manufacture of Oxygen Permeable Membrane

In the present example, a polymeric compound was synthesized by a Michael addition reaction with TPP having four amino groups and coordinated with cobalt as a CP complex and a di-functional acrylate as an acrylate compound.

In particular, a cured membrane manufactured using a CP complex of the tetra-substituted aminophenyl porphyrin (available from TCI) 2e coordinated with Co, and a di-functional acrylate (available from TCI, see Formula 4 above) with a fluoro group as a cross-linking agent was dissolved in hexafluoroisopropanol to obtain a mixture, which was then cast on a Teflon (registered trademark), and annealed at about 120° C. for about 12 hours, thereby manufacturing an oxygen permeable membrane of Example 4.

As in Example 1, the results of IR spectroscopy before and after the curing suggest that the Michael addition reaction with the tetra-substituted aminophenyl porphyrin occurred on the support membrane. A reaction conversion ratio of the acryl group was about 76%. A porphyrin content in the CP complex was about 70 weight % based on an initially added amount thereof.

Comparative Example 1

Manufacture of Oxygen Permeable Membrane

In the present comparative example, a polymeric compound was synthesized by a Michael addition reaction with tetraphenyl cobalt porphyrin, in which TPP without a nucleophile (able to act as a Michael donor) is coordinated with cobalt, as a CP complex and a tetra-functional acrylate as an acrylate compound.

Figure 3:
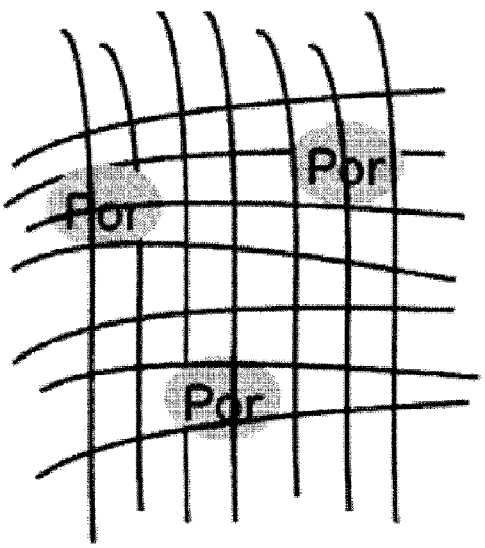
FIG. 3 is a schematic view of a structure of an oxygen permeable membrane of Comparative Example 1.

In particular, as illustrated in Reaction Scheme 5 below, 0.5 g of t-butylacetoacetate 5 and 0.55 g (0.5 eq) of tetra-functional acrylate 4 were dissolved in acetone, followed by addition of 10 mg of tetraphenyl cobalt porphyrin ("CoTPP") and then 1 weight % of DBU as a base to obtain a mixture, which was then used to manufacture an oxygen permeable membrane III of Comparative Example 1 as a rigid self-supporting membrane. A structure of the oxygen permeable membrane of Comparative Example 1 is schematically illustrated in FIG. 3.

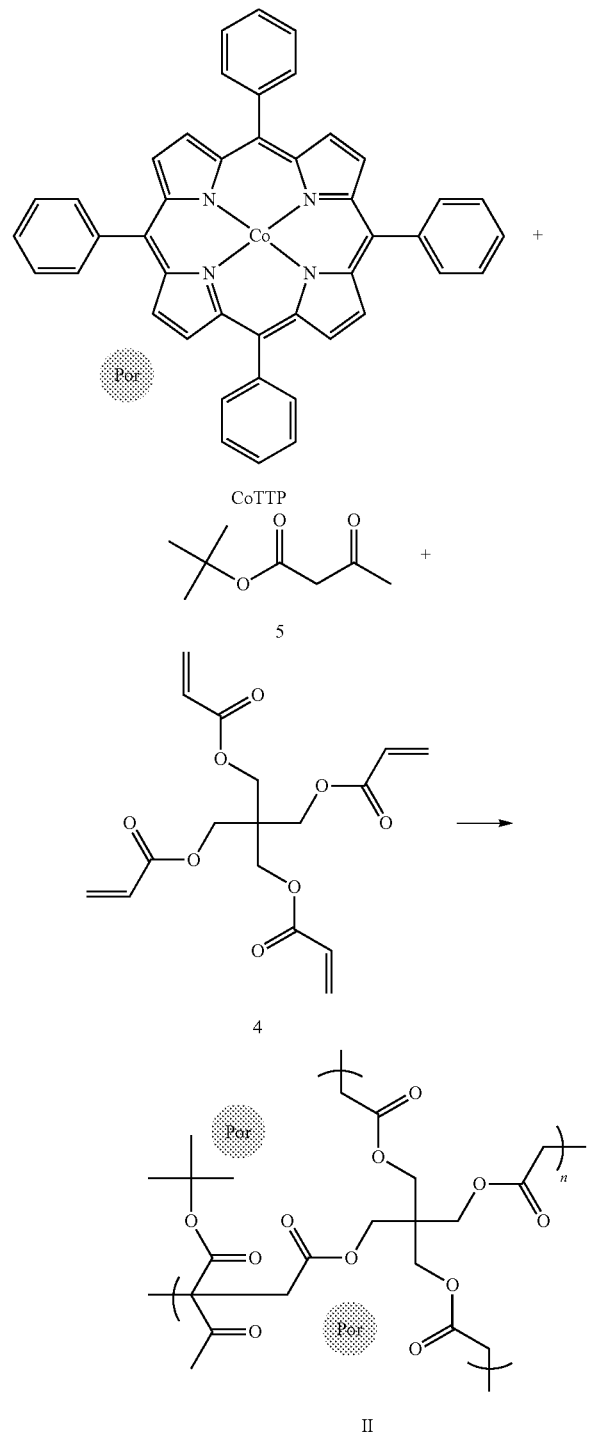

Reaction Scheme 5

As in Example 1, based on the IR spectra taken before and after the curing, a reaction conversion ratio of the acryl group was found to be about 90% or greater. Due to a very low solubility, leading to agglomeration of porphyrin, only about 1 to 2 weight % of porphyrin may be incorporated into the oxygen permeable membrane.

Comparative Example 2

Manufacture of Oxygen Permeable Membrane

In the present comparative example, a polymeric compound was synthesized by a Michael addition reaction with pentafluorotetraphenyl porphyrin ("PETPP") as a CP complex, obtained by incorporation of a fluoro group into tetraphenyl cobalt porphyrin, in which TPP without a nucleophile (able to act as a Michael donor) is coordinated with cobalt, and a tetra-functional acrylate as an acrylate compound.

In particular, as illustrated in Comparative Example 1, 0.5 g of t-butylacetoacetate 4 and 0.55 g (0.5 eq) of tetra-functional acrylate 4 were dissolved in acetone, followed by addition of 10 mg of PETPP and then 1 weight % of DBU as a base to obtain a mixture, which was then used to manufacture an oxygen permeable membrane III of Comparative Example 1 via heating at about 80° C. for about 3 hours.

As in Example 1, based on the IR spectra taken before and after the curing, a reaction conversion ratio of the acryl group was found to be about 90% or greater. Due to a very low solubility of PFTPP, as described in Comparative Example 1, only about 1 to 2 weight % of porphyrin may be incorporated to the oxygen permeable membrane.

Comparative Example 3

Manufacture of Oxygen Permeable Membrane

In the present comparative example, with reference to a non-patent reference (Nishide, et al. J. Phys. Chem. B 1998, 102, 8766), a polymer poly(vinylidene fluoride-co-vinylimidazole) and tetraphenyl porphyrin coordinated to cobalt were mixed together to obtain a 40 weight % mixture, which was then applied onto a support membrane.

Evaluation of Self-Supporting Property of Membrane

Self-supporting property of each oxygen permeable membrane was evaluated using a metal rod having a diameter of about 13 millimeters ("mm"), wherein an upper surface of an oxygen permeable membrane or an oxygen permeable membrane coated on the support membrane was pressed from above using the metal rod at room temperature to be bent by 180 degrees. The case with a breakage of the oxygen permeable membrane was represented as x, the case with a partial surface breakage of the oxygen permeable membrane was represented as □, and the case with no damage was represented as o. The evaluation results are shown in Table 1 below.

Evaluation of Water Repellency

The oxygen permeable membranes of Examples 1-4 and Comparative Examples 1-3 were each fixed to a 45° slanted plate, and pure water was dropped onto the oxygen permeable membrane with a microcylinder from about 5 cm above the oxygen permeable membrane. When water droplets remained on the surface of the oxygen permeable membrane, the state was denoted by x. When only some of the water droplets remained thereon, the state was denoted by □. When the water droplets were repelled by the oxygen permeable membrane, the state was denoted by o. The evaluation results are shown in Table 1 below.

Evaluation of Oxygen Permeability

A gas permeability coefficient P may be represented as a product of multiplying a diffusion coefficient D by a solubility coefficient S. The gas permeability coefficient P may be determined as a unique value independent from the membrane area or thickness, based on Equation 1 below. Equation 1 below is defined using a permeable flow rate Q [cubic centimeters, $cm^3$], a diffusion coefficient D [square centimeter×second$^{-1}$, $cm^2 \times s^{-1}$], a solubility multiplication product S [$cm^3$ (STP) $cm^{-3}$ cm Hg], a membrane thickness I [centimeter, cm], a cross-sectional area A [square centimeter, $cm^2$], and a pressure difference [centimeters of mercury, cmHg].

$$Q = \frac{DSA(p_1 - p_2)}{l} = \frac{PA(p_1 - p_2)}{l} \quad \text{Equation 1}$$

$$P = \frac{Q \times l}{A(p_1 - p_2)} = \frac{Q \times l}{A \Delta p}$$

The oxygen permeable membranes of Examples 1 to 4 were tested according to a pressurization method using a bubble flow meter ("BFM"), which allows a gas (oxygen and nitrogen) to permeate into the oxygen permeable membrane by applying a pressure from above the oxygen permeable membrane, and calculates the time it takes for the gas to permeate into a unit volume of the oxygen permeable membrane. This method may measure a permeable amount of a pure gas, and thus may be applicable to a thin film, a membrane with reduced strength due to a high concentration of a complex supported thereby, or a polymer membrane cast on a support membrane. The method may also be used to rapidly measure the permeable flow rate even with a very small sample quantity. The measurement results are shown in Table 1 below.

TABLE 1

|  | Porphyrin content (mass %) | Self-standing characteristics (single membrane) | Self-standing characteristics (with support membrane) | Water repellency | Permeability coefficient P (Voltage difference 5 cm Hg) (Barrers) |
|---|---|---|---|---|---|
| Example 1 | 80 | □ | o | □ | 33 |
| Example 2 | 70 | □ | o | □ | 23 |
| Example 3 | 70 | o | o | □ | 22 |
| Example 4 | 70 | □ | o | o | 20 |
| Comparative Example 1 | 1~2 | o | o | x | 1.5 |
| Comparative Example 2 | 1~2 | o | o | x | 1.0 |
| Comparative Example 3 | 40 | — | o | — | <1.0* |

*Estimated values based on graphs of the non-patent reference

Evaluation Results

As shown in Table 1, for a vinyl polymer incorporated with porphyrin as disclosed in the non-patent reference (Comparative Example 3), an amount of the porphyrin introduced into the vinyl polymer is limited to 40%. Such a polymer may not able to form a self-standing membrane. All of the oxygen permeable membranes of Examples 1 to 4 were able to stand alone even with a high content of porphyrin ranging from about 70 weight % to about 80 weight %. For the cured membranes of t-butylacetoacetate and multi-functional acetate physically mixed with porphyrin (Comparative Examples 1 and 2), the maximum amounts of porphyrin were as low as 2 weight %.

The oxygen permeable membranes of Examples 1 to 4 had substantially high oxygen permeability coefficients. Since the amount of porphyrin is proportional to the oxygen permeability coefficient, the increased amounts of porphyrin in the oxygen permeable membranes of Examples 1 to 4, which were found to be nearly twice as much as in conventional membranes, allow the preparation of membranes with higher oxygen permeability coefficients. In some embodiments, the oxygen permeability coefficient of the oxygen permeable membrane may be about 10 Barrers or greater, in some other embodiments, may be about 20 Barrers or greater, and in still some other embodiments, may be about 30 Barrers or greater.

When a polymeric compound was prepared by a Michael addition reaction of a CP complex to the acrylate compound including a fluoroalkyl backbone, as in Example 4, the oxygen permeable membrane including the polymeric compound had improved water repellency. The oxygen permeable membrane of Comparative Example 2, including porphyrin with a fluoro group, mixed with the cured membrane including a polymeric compound prepared from t-butylacetoacetate and multi-functional acrylate, was not found to have improved water repellency.

Performance Evaluation of Electrochemical Device

The oxygen permeable membrane of Example 1 was accommodated in a metal air battery, and capacity characteristics of the metal air battery were evaluated. In particular, a metal air battery was manufactured according to a non-patent reference (Yi-Chun Lu, et al., ELECTROCHEMICAL AND SOLID-STATE LETTERS 13(6) A69-A72 (2010)), and a charge-discharge test was performed using the metal air battery. A metal lithium foil (thickness 100 micrometers ("μm")) was attached to a negative electrode. A glass filter (Whatman GF/A) was permeated with an electrolytic solution of a 1M lithium bis(trifluoromethanesulfonyl)imide ("LiTFSI") dissolved in tetraethylene glycol dimethyl ether (tetraglyme) dehydrated through molecular sieves and then dissolved in lithium bis(trifluoromethanesulfonyl)imide ("LiTFSI"), and was then placed on the negative electrode. An electrode (available from Electrochem Inc., Pt loading=1 mg/cm$^2$ on Vulcan XC72 (catalyst) and coated on carbon paper) with a gas diffusion layer thereon was punched to have a hole of a predetermined size and used as an air electrode. A charging/discharging test was performed with the air battery being at about 25° C. using a Cell test 1470E (available from Solartron Inc.) through galvanostatic charging/discharging cycles at a constant current of about 0.2 mAcm$^{-2}$. The voltage is about 4.2 V (charging) and about 2.0 V (discharging) throughout the charging/discharging cycles.

When air inflows into each cell with a PFA tube of about ⅛ inch in a gas inlet of the cell and with a flange supporting the oxygen permeable membrane of Example 1, a capacity of the battery was measured. A membrane region exposed through the flange had a diameter of about 4 cm. A Ni-sintered porous structure for preventing membrane damage was disposed and supported further with a Teflon (a registered trademark) gasket to prevent a gas leakage. Air was supplied into the air electrode at a mass flow rate of about 5 cubic centimeters ("cc") per minutes using a compressor.

As a comparative example, the test was performed on a battery which included Cellgard (polyolefin separator) as the only membrane support.

Figure 4:
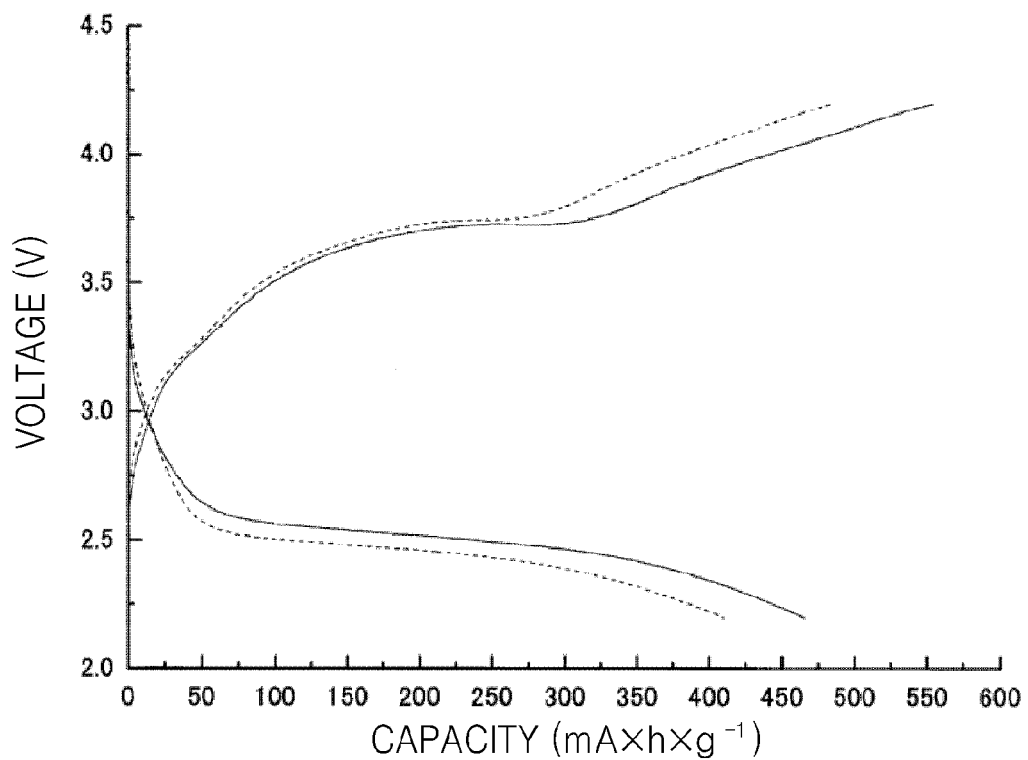
FIG. 4 is a graph of voltage (Volts, V) versus capacity (milliAmpere×hour×gram$^{-1}$, mA×h×g$^{-1}$) showing a difference in charge-discharge curve between a battery with the oxygen permeable membrane of Example 1 (shown in a dashed line) and a battery without oxygen permeable membrane (shown in a solid line).

The test results are shown in FIG. 4. FIG. 4 is a graph showing a difference in charge-discharge curves between a battery with the oxygen permeable membrane of Example 1 and a battery without an oxygen permeable membrane. In FIG. 4, the vertical axis indicates voltage, and the horizontal axis indicates charge/discharge capacity. The charge-discharge curve of the battery with the oxygen permeable membrane of Example 1 is denoted by dashed lines, and that of the battery of Comparative Example without an oxygen permeable membrane is denoted by solid lines.

Referring to FIG. 4, the discharge curve of the battery provided with gas through the oxygen permeable membrane of Example 1 showed about a 60 mV higher average discharge voltage at half capacity than the battery of Comparative Example. A chargeable/dischargeable capacity of the battery of Example 1 was about 10% higher than the battery of Comparative Example. This increase in capacity is attributed to an increased oxygen partial pressure resulting from the use of the oxygen permeable membrane.

Although the above embodiments are described with reference to a metal air battery as the electrochemical device, the present disclosure is not limited thereto. For example, according to embodiments of the present disclosure the electrochemical device may be any battery using oxygen in a redox reaction, for example, a fuel cell.

Furthermore, a tetraphenylporphyrin derivative, and a metal porphyrin complex of a tetraphenylporphyrin derivative coordinated with an equivalent transition metal may also exhibit selective oxygen permeability, which may be lower than a cobalt complex.

As described above, according to the one or more of the above embodiments of the present disclosure, a polymeric compound capable of intercalating/deintercalating oxygen may be prepared by adding a CP complex having a nucleophile to a multi-functional (meth)acrylate by a Michael addition reaction. An oxygen permeable membrane using the polymeric compound, and an oxygen permeable composite using the oxygen permeable membrane may exhibit satisfactory oxygen permeability. Disposing the oxygen permeable membrane or the oxygen permeable composite near an oxygen inlet of an electrochemical device ensures stable supply of an oxidant with a high oxygen partial pressure (air having a high oxygen concentration) to an electrochemical device, so that the electrochemical device may have improved electrochemical characteristics.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A polymeric compound comprising a backbone structure comprising an addition reaction product of a (meth)acrylate compound and a nucleophile of a cobalt porphyrin complex comprising a tetraphenylporphyrin derivative represented by Formula 1 coordinated to a cobalt metal, Formula 1

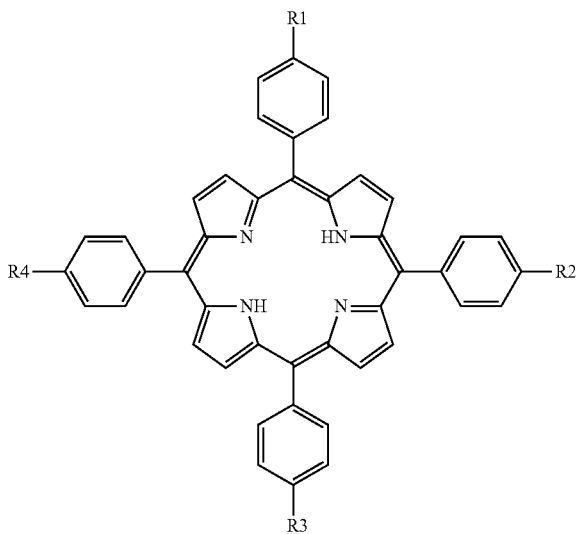

wherein
at least one of substituents R1 to R4 is a nucleophile, and the remaining substituents R1 to R4 are each independently a hydrogen atom, a halogen atom, a C1-C10 alkyl group, a C1-C10 alkenyl group, a C1 to C10 alkynyl group, or a C6-C12 aryl group.

2. The polymeric compound of claim 1, wherein the (meth)acrylate compound comprises a multi-functional (meth)acrylate.

3. The polymeric compound of claim 1, wherein the (meth)acrylate compound comprises a di-functional (meth)acrylate, and the tetraphenylporphyrin derivative comprises at least two nucleophiles.

4. The polymeric compound of claim 1, wherein the (meth)acrylate compound comprises a tri-functional (meth)acrylate or a higher order multi-functional (meth)acrylate.

5. The polymeric compound of claim 1, wherein the (meth)acrylate compound comprises a fluoroalkyl backbone.

6. The polymeric compound of claim 1, wherein the nucleophile comprises an amino group, an acetoacetate group, or a combination thereof.

7. The polymeric compound of claim 1, wherein a main chain of the backbone of the polymeric compound comprises the reaction product of the (meth)acrylate compound and the cobalt porphyrin complex.

8. The polymeric compound of claim 1, wherein a main chain of the backbone of the polymeric compound comprises a polymerization product of the (meth)acrylate compound, and a side chain from the main chain comprises the cobalt porphyrin complex.

9. The polymeric compound of claim 1, wherein a content of the cobalt porphyrin complex in the polymeric compound is about 70 weight % or greater.

10. An oxygen permeable membrane comprising the polymeric compound of claim 1.

11. The oxygen permeable membrane of claim 10, wherein an oxygen permeability coefficient of the oxygen permeable membrane is about 10 Barrers or greater.

12. An oxygen permeable composite comprising the oxygen permeable membrane of claim 10 disposed on a porous substrate or in pores of the porous substrate.

13. An electrochemical device comprising:
a positive electrode using oxygen as a positive active material;
a negative electrode comprising a metal as a negative active material;
an electrolyte disposed between the positive electrode and the negative electrode; and
a barrier, disposed on the positive electrode, comprising the oxygen permeable membrane of claim 10 or the oxygen permeable composite of claim 12,
wherein the barrier facilitates an intake of the oxygen from an external source to the positive electrode.

14. The electrochemical device of claim 13, wherein the metal is lithium or a lithium alloy.

15. The electrochemical device of claim 13, wherein the electrochemical device is a metal air battery or a fuel cell.

16. The electrochemical device of claim 15, wherein the metal air battery is a lithium air battery.

* * * * *